(12) United States Patent
Otake et al.

(10) Patent No.: US 6,952,919 B2
(45) Date of Patent: Oct. 11, 2005

(54) EXHAUST GAS PURIFYING SYSTEM FOR INTERNAL COMBUSTION ENGINE

(75) Inventors: Makoto Otake, Yokohama (JP);
Junichi Kawashima, Kanagawa (JP);
Naoya Tsutsumoto, Yokohama (JP);
Terunori Kondou, Yokohama (JP);
Takao Inoue, Yokohama (JP);
Toshimasa Koga, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/755,316

(22) Filed: Jan. 13, 2004

(65) Prior Publication Data

US 2004/0144086 A1 Jul. 29, 2004

(30) Foreign Application Priority Data

Jan. 28, 2003 (JP) ........................................ 2003-019312

(51) Int. Cl.⁷ ................................................. F01N 3/00
(52) U.S. Cl. ........................... 60/297; 60/274; 60/278; 60/280; 60/286; 60/295; 60/300
(58) Field of Search ................... 60/274, 278, 280, 60/284, 286, 295, 297, 303, 311, 300

(56) References Cited

U.S. PATENT DOCUMENTS

| | | | | |
|---|---|---|---|---|
| 5,287,698 A | * | 2/1994 | Shinzawa et al. | 60/286 |
| 6,304,815 B1 | * | 10/2001 | Moraal et al. | 701/115 |
| 6,438,948 B2 | * | 8/2002 | Ono et al. | 60/311 |
| 6,594,990 B2 | * | 7/2003 | Kuenstler et al. | 60/295 |
| 6,598,387 B2 | * | 7/2003 | Carberry et al. | 60/297 |
| 6,672,050 B2 | * | 1/2004 | Murata et al. | 60/284 |
| 6,681,565 B2 | * | 1/2004 | Russell | 60/286 |
| 6,708,487 B2 | * | 3/2004 | Morimoto et al. | 60/311 |
| 6,758,037 B2 | * | 7/2004 | Terada et al. | 60/295 |

FOREIGN PATENT DOCUMENTS

| | | |
|---|---|---|
| DE | 199 57 715 A1 | 6/2000 |
| EP | 1 176 298 A2 | 1/2002 |
| EP | 1 375 877 A2 | 1/2004 |
| EP | 1 426 591 A2 | 6/2004 |
| JP | 2002-089327 A | 3/2002 |

OTHER PUBLICATIONS

U.S. Appl. No. 10/751,940, filed Jan. 7, 2004, Takao Inoue et al.
U.S. Appl. No. 10/752,518, filed Jan. 8, 2004, Toshimasa Koga et al.
U.S. Appl. No. 10/752,519, filed Jan. 8, 2004, Toshimasa Koga et al.
U.S. Appl. No. 10/751,883, filed Jan. 7, 2004, Takao Inoue et al.
U.S. Appl. No. 10/756,502, filed Jan. 14, 2004, Terunori Kondou et al.
U.S. Appl. No. 10/752,427, filed Jan. 7, 2004, Takao Inoue et al.

* cited by examiner

Primary Examiner—Tu M. Nguyen
(74) Attorney, Agent, or Firm—Foley & Lardner LLP

(57) ABSTRACT

An exhaust gas purifying system for an automotive internal combustion engine. The exhaust gas purifying system includes a particulate filter disposed in an exhaust gas passageway of the engine to collect particulate in exhaust gas flowing through the exhaust gas passageway. The collected particulate is burnt off to be removed by raising a temperature of exhaust gas in a condition in connection with the particulate filter. A plurality of devices are provided for raising the temperature of exhaust gas to be introduced into the particulate filter through the exhaust gas passageway when the collected particulate is burned off to be removed. Additionally, a control unit is configured to select at least one of the devices in accordance with an engine operating region and preferentially operate the selected at least one of the devices for raising the exhaust gas temperature.

11 Claims, 6 Drawing Sheets

| NO | DEVICES FOR RAISING EXHAUST GAS TEMPERATURE |
|---|---|
| 1 | DEVICE FOR DECREASING INTAKE AIR AMOUNT |
| 2 | DEVICE FOR CONTROLLING POST INJECTION AMOUNT |
| 3 | DEVICE FOR CONTROLLING POST INJECTION TIMING |
| 4 | DEVICE FOR CONTROLLING MAIN INJECTION TIMING |
| 5 | DEVICE FOR CONTROLLING EGR VALVE OPENING DEGREE |
| 6 | DEVICE FOR CONTROLLING SUPERCHARGING PRESSURE (VNT OPENING DEGREE) |

| ENGINE OPERATING REGION | DEVICE(S) USED AT FIRST STEP | DEVICE(S) USED AT SECOND STEP |
|---|---|---|
| A | 1 – 2 – 3 – 4 | 5 – 6 |
| B | 2 – 3 – 4 | 1 – 5 – 6 |
| C | 2 – 3 – 4 | 6 |
| D | 4 – 5 – 6 | 2 – 3 |
| E | 4 | 2 – 3 – 6 |
| F | 4 | 6 |

FIG.5A

| NO | DEVICES FOR RAISING EXHAUST GAS TEMPERATURE |
|---|---|
| 1 | DEVICE FOR DECREASING INTAKE AIR AMOUNT |
| 2 | DEVICE FOR CONTROLLING POST INJECTION AMOUNT |
| 3 | DEVICE FOR CONTROLLING POST INJECTION TIMING |
| 4 | DEVICE FOR CONTROLLING MAIN INJECTION TIMING |
| 5 | DEVICE FOR CONTROLLING EGR VALVE OPENING DEGREE |
| 6 | DEVICE FOR CONTROLLING SUPERCHARGING PRESSURE (VNT OPENING DEGREE) |

FIG.5B

| ENGINE OPERATING REGION | DEVICE(S) USED AT FIRST STEP | DEVICE(S) USED AT SECOND STEP |
|---|---|---|
| A | 1-2-3-4 | 5-6 |
| B | 2-3-4 | 1-5-6 |
| C | 2-3-4 | 6 |
| D | 4-5-6 | 2-3 |
| E | 4 | 2-3-6 |
| F | 4 | 6 |

EXHAUST GAS PURIFYING SYSTEM FOR INTERNAL COMBUSTION ENGINE

BACKGROUND OF THE INVENTION

This invention relates to improvements in an exhaust gas purifying system, and more particularly to a technique for burning off particulate (Particulate Matter in exhaust gas, referred hereafter to as "PM") in exhaust gas collected in a filter, by raising the temperature of exhaust gas.

In recent years, internal combustion engines, particularly diesel engines are equipped with a Diesel Particulate Filter (referred hereinafter to as "DPF") for collecting PM in exhaust gas. When the amount of the collected PM reaches a certain level, the temperature of exhaust gas is raised to burn off PM thereby regenerating DPF, as disclosed in Japanese Patent Provisional Publication No. 2002-89327.

SUMMARY OF THE INVENTION

When the DPF is regenerated, a plurality of exhaust gas temperature raising means are used together in order to effectively raise the exhaust gas temperature. However, these means are different in temperature rising sensitivity and influence on driveability of the engine, and therefore the means suitable for raising the exhaust gas temperature are different in accordance with engine operating regions.

Hitherto, such a fact has not been sufficiently taken into consideration, and therefore it has occurred that the exhaust gas temperature cannot be effectively raised and that the influence on the driveability increases. This complicates a control for raising the exhaust gas temperature, thereby making it difficult to smoothly converging the exhaust gas temperature into a target level.

It is, therefore, an object of the present invention to provide an improved exhaust gas purifying system for an internal combustion engine, which can effectively overcome drawbacks encountered in conventional exhaust gas purifying systems or similar techniques.

Another object of the present invention is to provide an improved exhaust gas purifying system for an internal combustion engine, by which a temperature of exhaust gas from the engine is effectively raised thereby smoothly converging the exhaust gas temperature into a target level, thus raising a burning-off and removing efficiency of PM and a regeneration efficiency of DPF.

A further object of the present invention is to provide an improved exhaust gas purifying system for an internal combustion engine, in which a DPF regeneration control is accomplished taking account of the fact that a device suitable for raising the exhaust gas temperature is different depending upon an engine operating region.

An aspect of the present invention resides in an exhaust gas purifying system for an internal combustion engine. The exhaust gas purifying system comprises a particulate filter disposed in an exhaust gas passageway of the engine to collect particulate in exhaust gas flowing through the exhaust gas passageway. The collected particulate is burnt off to be removed by raising a temperature of exhaust gas in a condition in connection with the particulate filter. A plurality of devices are provided for raising the temperature of exhaust gas to be introduced into the particulate filter through the exhaust gas passageway when the collected particulate is burned off to be removed. Additionally, a control unit is configured to select at least one of the devices in accordance with an engine operating region and preferentially operate the selected at least one of the devices so as to raise the exhaust gas temperature.

Another aspect of the present invention resides in an exhaust gas purifying system for an internal combustion engine. The exhaust gas purifying system comprises particulate filter disposed in an exhaust gas passageway of the engine to collect particulate in exhaust gas flowing through the exhaust gas passageway. The collected particulate is burnt off to be removed by raising a temperature of exhaust gas in a condition in connection with the particulate filter. A plurality of devices are provided for raising the temperature of exhaust gas to be introduced into the particulate filter through the exhaust gas passageway when the collected particulate is burned off to be removed. In the above arrangement, at least one of the devices are selected in accordance with an engine operating region and preferentially operated for raising the exhaust gas temperature.

A further aspect of the present invention resides in an exhaust gas purifying system for an internal combustion engine. The exhaust gas purifying system comprises a particulate filter disposed in an exhaust gas passageway of the engine to collect particulate in exhaust gas flowing through the exhaust gas passageway. The collected particulate is burnt off to be removed by raising a temperature of exhaust gas in a condition in connection with the particulate filter. A plurality of means are provided for raising the temperature of exhaust gas to be introduced into the particulate filter through the exhaust gas passageway when the collected particulate is burned off to be removed. In the above arrangement, at least one of the means are selected in accordance with an engine operating region and preferentially operated for raising the exhaust gas temperature.

A still further aspect of the present invention resides in a method of operating an exhaust gas purifying system for an internal combustion engine, the exhaust gas purifying system including a particulate filter disposed in an exhaust gas passageway of the engine to collect particulate in exhaust gas flowing through the exhaust gas passageway, the collected particulate being burnt off to be removed by raising a temperature of exhaust gas in a condition in connection with the particulate filter; and a plurality of devices operated for raising the temperature of exhaust gas to be introduced into the particulate filter through the exhaust gas passageway when the collected particulate is burned off to be removed. The operating method comprises (a) selecting at least one of the devices in accordance with an engine operating region; and (b) preferentially operating the selected at least one of the devices to raise the exhaust gas temperature.

BRIEF DESCRIPTION OF THE DRAWINGS

FIG. 5A is a table showing devices for raising an exhaust gas temperature, used in the control routine of FIGS. 2 and 3;

FIG. 5B is a table showing the device(s) preferentially used at first and second steps in accordance with engine operating regions.

DETAILED DESCRIPTION OF THE INVENTION

Figure 1A:
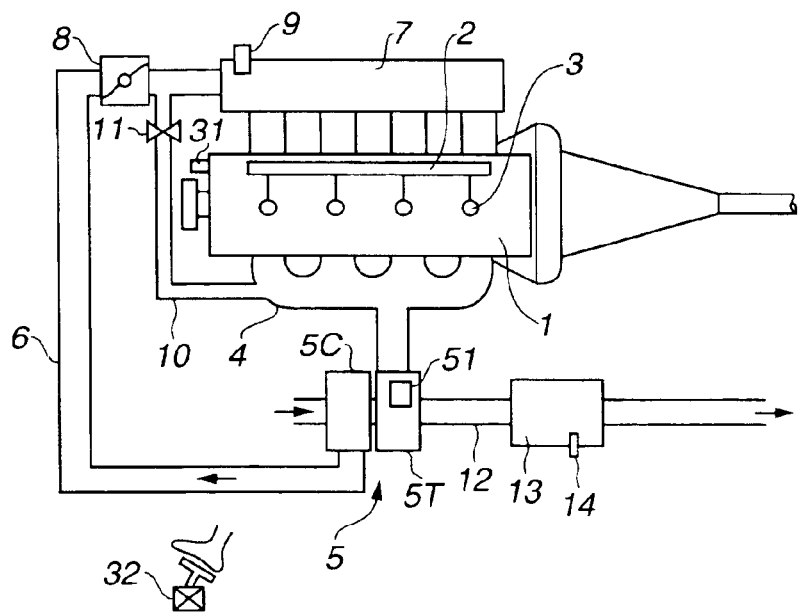
FIG. 1A is a schematic illustration of an embodiment of an exhaust gas purifying system according to the present invention, in combination with an internal combustion engine.

Referring now to FIG. 1A, an embodiment of an exhaust gas purifying system is illustrated in combination with an internal combustion engine 1 which is a diesel engine in this case. The engine 1 is provided with a common rail fuel injection system which includes a common rail 2 through which fuel is supplied to fuel injectors 3. Each fuel injector 3 has an electromagnetic valve which is switched ON to inject fuel and switched OFF to stop fuel injection. A fuel injection amount (the amount of fuel injected from fuel injector 3) of fuel injector 3 is determined by a fuel injection control signal fed to fuel injector 3. The common rail 2 is supplied with fuel from a fuel supply pump (not shown).

Engine 1 includes an exhaust manifold 4 through which exhaust gas from the cylinders of engine 1 flows. Turbocharger 5 includes a turbine 5T which is disposed downstream of exhaust manifold 4 so that exhaust gas from exhaust manifold 4 is supplied to turbine 5T. Compressor 5C of turbocharger 5 is disposed in an intake air passageway 6 through which intake air flows. Compressor 5C has a compressor wheel (not shown) which is mounted on a common shaft on which a turbine wheel of turbine 5T is mounted. Intake air is compressed by compressor 5C and thereafter flows through the intake air passageway 6 and collector 7 to be sucked into the cylinders of engine 1. Throttle valve (intake air control valve) 8 is disposed in the intake air passageway 6 to control an intake air amount (the amount of intake air). Turbocharger 4 is of the variable capacity type and arranged to increase a turbine efficiency so as to increase a supercharging pressure (an intake air pressure developed by compressor 5C) by reducing an opening degree or flow-path cross-sectional area of variable nozzle (VNT) of the turbocharger by an actuator 51 disposed on the side of the turbine 5T and to decrease the turbine efficiency so as to decrease the supercharging pressure by increasing the flow-path cross-sectional area of the variable nozzle. Supercharging pressure sensor 9 is disposed in collector 7 in order to detect the supercharging pressure (the intake air pressure).

EGR passage 10 is provided to connect exhaust manifold 4 with the intake air passageway 10. EGR valve 11 is disposed in EGR passage 10 and adapted to control an EGR gas amount (the amount of EGR gas flowing through the EGR passage) in accordance with an opening degree of EGR valve 11.

Exhaust gas passageway 12 is formed through exhaust manifold 4 and extends through turbine 5T of turbocharger 5. DPF (Diesel Particulate Filter) 13 is disposed in the exhaust gas passageway 12 downstream of the turbine 5T in order to collect or trap PM (Particulate Matter) in exhaust gas. DPF 13 is provided with DPF temperature sensor 14 in order to detect a temperature of DPF 13.

Figure 1B:
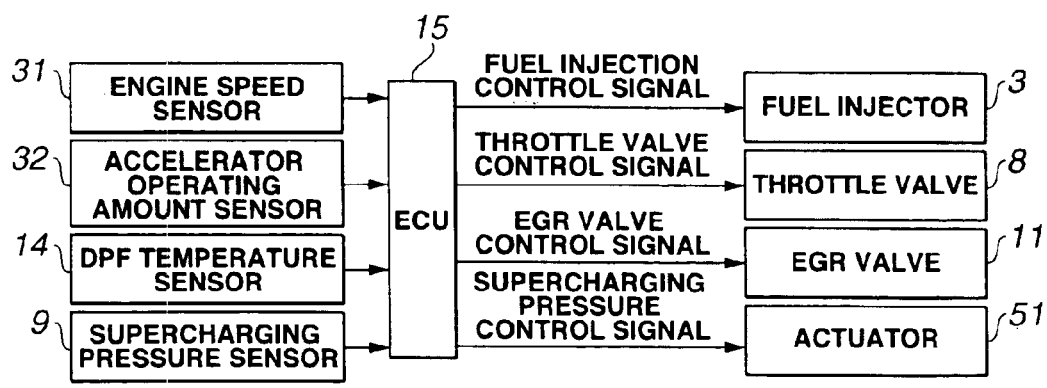
FIG. 1B is a schematic block diagram of the exhaust gas purifying system of FIG. 1A.

As shown in FIG. 1B, engine (electronic) control unit 15 is electronically connected to fuel injector 3, throttle valve 8, supercharging pressure sensor 9, EGR valve 11, DPF temperature sensor 14, actuator 51, engine speed sensor 31 adapted to detect an engine speed of engine 1, and accelerator operating amount sensor 32 adapted to detect an operating amount of an accelerator (pedal) shown in FIG. 1A. Supercharging pressure sensor 9 is adapted to generate a supercharging pressure signal representative of the supercharging pressure. DPF temperature sensor 14 is adapted to generate a DPF temperature signal representative of the DPF temperature. Engine speed sensor 31 is adapted to generate an engine speed signal representative of the engine speed. Accelerator operating amount sensor 32 is adapted to generate an accelerator operating amount signal representative of the accelerator operating amount. The supercharging pressure signal, the DPF temperature signal, the engine speed signal and the accelerator operating amount signal are input to the engine control unit 15, upon which the engine control unit 15 outputs the fuel injection control signal to fuel injector 3, a throttle valve control signal to throttle valve 8, an EGR valve control signal to EGR valve 11 and a supercharging pressure control signal to actuator 51 in accordance with the above-mentioned signal(s) input to engine control unit 15.

The fuel injection control signal is representative of the fuel injection amount in which fuel is injected from fuel injector 3. The throttle valve control signal is representative of the intake air amount to be determined by throttle valve 8. The EGR valve control signal is representative of the EGR gas amount to be determined by EGR valve 11. The supercharging pressure control signal is representative of the supercharging pressure to be developed by compressor 5C of turbocharger 5.

With the exhaust gas purifying system shown in FIGS. 1A and 1B, when DPF 13 is regenerated, an operation of raising the exhaust gas temperature is carried out by using at least one of a plurality of devices (means) for raising the exhaust gas temperature thereby accomplishing a control for burning off and removing PM collected in DPF 13.

Figure 2:
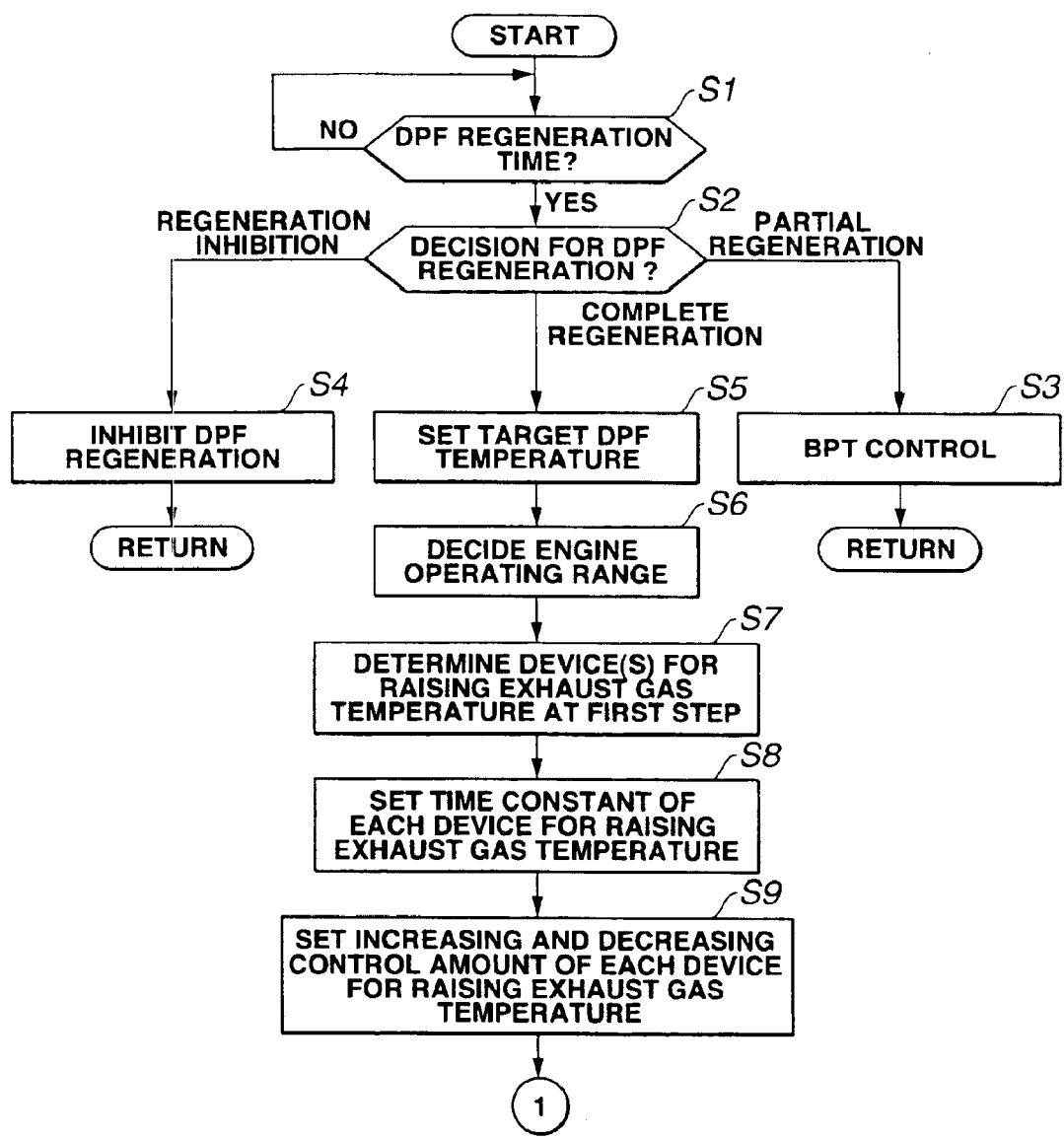
FIG. 2 is a flowchart showing a former stage of a control routine of the exhaust gas purifying system of FIG. 1.
Figure 3:
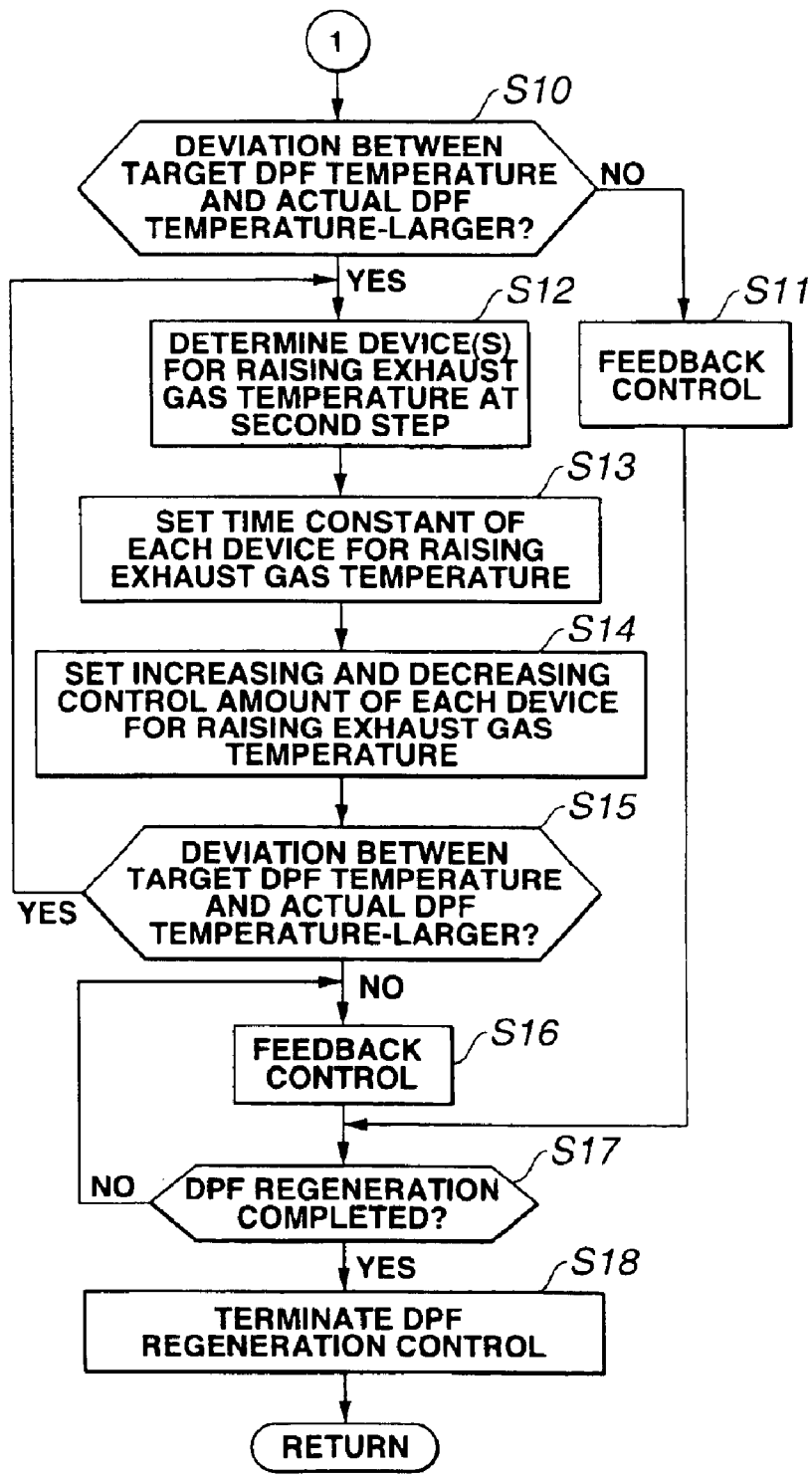
FIG. 3 is a flowchart showing a latter stage of the control routine of the exhaust gas purifying system of FIG. 1.

Next, a control of regeneration of DPF 13 will be discussed with reference to flowcharts of FIGS. 2 and 3.

At step S1, a decision is made as to whether a regeneration time for DPF 13 has come or not. Specifically, an amount of PM collected by DPF 13 is estimated by accumulating estimated amounts of PM in exhaust gas emitted from the engine, each estimated PM amount varying in accordance with engine operating condition, upon which the decision of the generation time having come is made when the accumulated estimated PM amounts reaches a certain level.

At step S2, a decision is made as to whether execution of an actual DPF regeneration is to be made or not and for a regeneration level or degree to be made for DPF 13 in accordance with an engine operating region. When the decision of executing a partial generation of DPF 13 is made in accordance with the engine operating region, a flow goes to step S3 at which a BPT (Balance Point Temperature) control is made for a certain time. The BPT control is to decrease the opening degree of throttle valve 8 to obtain a target DPF temperature, for example, of 400° C. By this, the intake air amount is reduced thereby raising a temperature of exhaust gas, so that a part of PM collected in DPF 13 is burnt off and removed thus partly regenerating DPF 13.

When the decision has been made such that execution of a control for raising exhaust gas temperature largely affects an engine performance in the engine operating region so as to be problematic at step S2, the flow goes to step S4 at which regeneration of DPF 13 has inhibited.

When the decision of executing a complete regeneration (in which the whole collected PM is to be burnt off) of DPF 13 is made at step S2, the flow goes to step S5 in order to execute a control for the complete regeneration of DPF 13.

At step S5, a target DPF temperature is set. The target DPF temperature is, for example, 570° C. in a first step (discussed after) and 670° C. in a second step (discussed after). Here, the temperature required for burning off PM is a temperature of or in DPF 13 by which PM is collected; however, the temperatures controlled by the respective devices for raising the exhaust gas temperature is an exhaust gas temperature (the temperature of exhaust gas from engine 1), so that the exhaust gas temperature is controlled to become the above-mentioned target DPF temperature. In other words, the target DPF temperature is a target exhaust gas temperature (the target temperature of exhaust gas).

At step S6, in case of executing the complete regeneration of DPF 13, an operating region decision is made to decide the engine operating region in order to select the device(s) preferentially used in accordance with the engine operating region.

Figure 4:
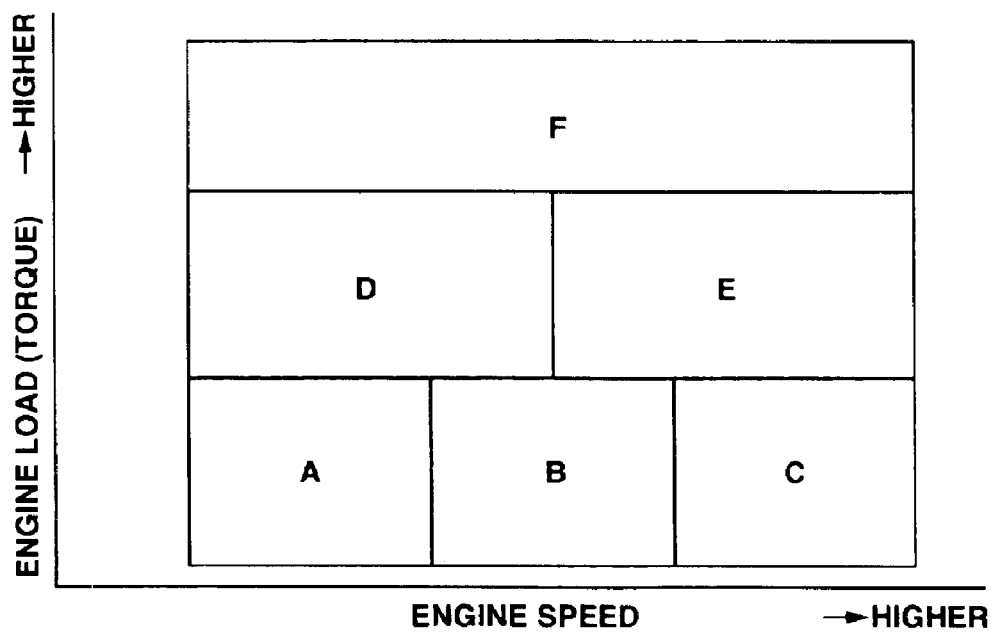
FIG. 4 a graph showing a map for deciding an engine operating region, used in the control routine of FIGS. 2 and 3.

At step S7, the device(s) preferentially used at the first step is determined or selected in accordance with the engine operating region decided at step S6. The devices 1, 2, 3, 4, 5 and 6 for raising the exhaust gas temperature are shown in FIG. 5A. More specifically, the determination is made in accordance with FIG. 4 and FIGS. 5A and 5B. That is, in the engine operating region A (in FIG. 4) which is low in engine speed and low in engine load, using or selecting the devices 1, 2, 3 and 4 is determined. The device 1 makes decreasing the intake air amount by decreasing the opening degree of throttle valve 8. The device 2 makes controlling the (fuel) injection amount in a post injection in expansion and exhaust strokes after a main injection (for combustion of fuel in the cylinder), the injection amount at the post injection being referred hereinafter to as "post injection amount". The device 3 makes controlling a (fuel) injection timing in the post injection which timing is referred hereinafter as "post injection timing". The device 4 makes controlling the injection timing in the main injection which timing is referred hereinafter to as "main injection timing". Here, when the post injection amount is increased by the device 2, an after-burning amount (the amount of fuel burnt after combustion in the cylinder) in DPF 13 increases thereby raising the DPF temperature. The post injection timing by the device 3 is controlled in accordance with the post injection amount. Retarding the main injection timing by the device 4 causes combustion in the cylinder to be retarded, thereby raising the temperature of exhaust gas from the cylinder or combustion chamber.

In the engine operating region B which is medium in engine speed and low in engine load, using the devices 2, 3 and 4 preferentially at the first step is determined. The device 2 makes controlling the post injection amount. The device 3 makes controlling the post injection timing. The device 4 makes controlling the main injection timing.

In the engine operating region C which is high in engine speed and low in engine load, using the devices 2, 3 and 4 preferentially at the first step is determined as same as in the engine operating region B. The device 2 makes controlling the post injection amount. The device 3 makes controlling the post injection timing. The device 4 makes controlling the main injection timing.

In the engine operating region D which is medium in engine load and low to medium in engine speed, using the devices 4, 5 and 6 preferentially at the first step is determined. The device 4 makes controlling the main injection timing. The device 5 makes controlling an opening degree of EGR valve 11 which is referred hereinafter to as "EGR valve opening degree". The device 6 makes controlling the super-charging pressure by controlling the opening degree of the variable nozzle (VNT) of turbocharger 5 by actuator 51, the opening degree of the variable nozzle being referred hereafter as to "VNT opening degree". Here, when the EGR valve opening degree is increased so as to increase an EGR rate (the rate of the EGR gas amount relative to the intake air amount), the amount of EGR gas which is relatively high in temperature increases thereby decreases the amount of fresh air which is relatively low in temperature. As a result, the temperature of exhaust gas rises. Additionally, when the opening degree of the variable nozzle (VNT) is increased to decrease the supercharging pressure, the amount of fresh air is decreased thereby raising the exhaust gas temperature.

In the engine operating region E which is medium in engine load and medium to high in engine speed, using only the device 4 preferentially at the first step is determined. The device 4 makes controlling the main injection timing.

In the engine operating region F which is high in engine load, only the device 4 preferentially used at the first step is determined as same as in the engine operating region E. The device 4 makes controlling the main injection timing.

It will be seen that the functions of the devices 1 to 6 are tabulated in FIG. 5A, and the devices preferentially used at the first step in the respective engine operating ranges are tabulated in FIG. 5B.

Figure 6A:
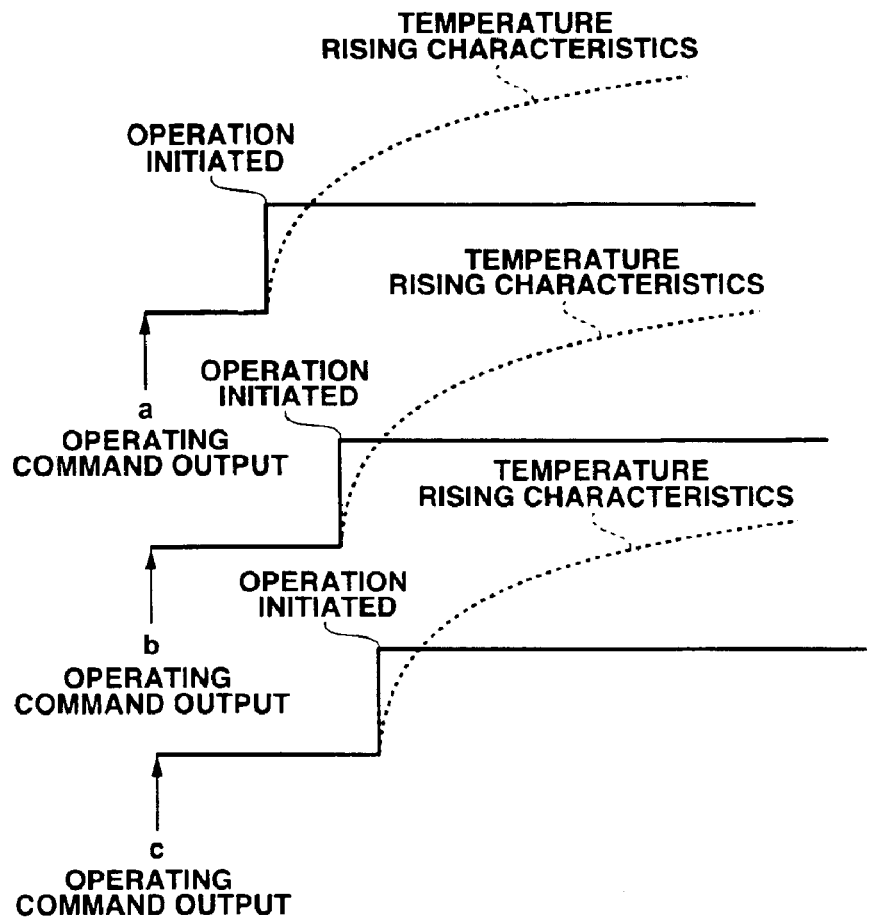
FIGS. 6A and 6B are graphs illustrating such an operation of the exhaust gas purifying system of FIG. 1 that a plurality of the devices are controlled to have the same temperature rising characteristics for exhaust gas.
Figure 6B:
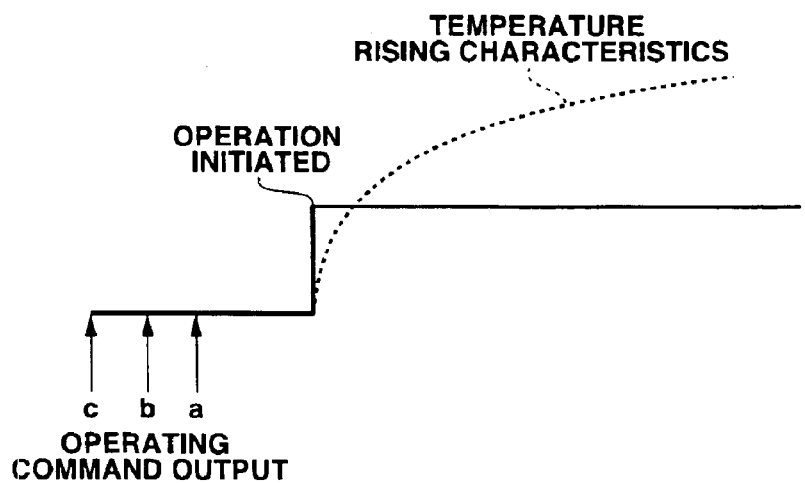

At step 8, a time constant of each of the devices for raising the exhaust gas temperature, determined at step S7 is set. More specifically, when only one device is selected as in the engine operating region E and the engine operating region F, the selected device 4 is immediately operated. However, when a plurality of the devices are selected as in other engine operating regions A to D, the time constant of each device is set in order to make the devices the same in temperature raising response. For example, in case that a delay time of each device between a time at which an operating command (the command for operating the device) is issued or output and a time at which the device is actually operated is different among the plurality of the devices 1 to 6 as shown in FIG. 6A, the outputs of the operating commands of other devices than the device having the longest delay time are delayed such that operations of the other devices are initiated at an operation initiating timing (indicated as "Operation Initiated" in FIG. 6A) of the device having the longest delay time.

At step S9, an increasing and decreasing control amount of each device for raising the exhaust gas temperature is set. More specifically, before the initiation of the regeneration control for DPF 13 is made, a control amount of each device is set as a normal state control amount in accordance with an engine operating condition and by means of a map or the like. However, after the initiation of the DPF regeneration control, the control amount of each device is set as the increasing and decreasing control amount (or correction amount) in accordance with a deviation between the above-mentioned target DPF temperature and an actual DPF temperature detected by DPF temperature sensor 14 by means of a map or the like separately provided, in order to raise the exhaust gas temperature. Such setting the increasing and decreasing amount is made only once at the initiation time of the DPF regeneration control, and is by an open control different from a feedback control discussed after.

With the above settings, the DPF regeneration control at the first step is executed by the preferentially selected device(s) in order to raise the exhaust gas temperature.

Next, at step S10, a decision is made as to whether the deviation ("the target DPF temperature—the actual DPF temperature") between the above-mentioned target DPF temperature and the actual DPF temperature is larger than a certain level or not, after lapse of a certain time from the initiation of the DPF regeneration control at the first step.

When such a decision that the above-mentioned deviation has decreased to a value of not larger than the certain level is made at step 10, the flow goes to step S11 at which the open control is changed into the feedback control in order to converge the actual DPF temperature into the target DPF temperature, successively detecting the actual DPF temperatures.

When such a decision that the above-mentioned deviation (the target DPF temperature—the actual DPF temperature) is larger than the certain level is made at step 10, an exhaust gas temperature raising degree upon the control by only the device(s) at the first step is judged to be too low, and therefore the flow goes to step S12 for adding a control for raising the exhaust gas temperature by the device(s) at a second step.

At step S12, the device(s) at the second step to be added are determined or selected in accordance with the engine operating region. Such determination is made in accordance with FIG. 4 and FIGS. 5A and 5B.

More specifically, in the engine operating region A which is low in engine speed and low in engine load, the devices 5 and 6 are determined or selected as the devices at the second step to be added. The device 5 makes controlling the EGR valve opening degree. The device 6 makes controlling the supercharging pressure.

In the engine operating region B which is medium in engine speed and low in engine load, the devices 1, 5 and 6 are determined or selected as the devices at the second step to be added. The device makes decreasing the opening degree of throttle valve 8. The device 5 makes controlling the EGR valve opening degree. The device 6 makes controlling the supercharging pressure.

In the engine operating region C which is high in engine speed and low in engine load, the device 6 is determined or selected as the device at the second step to be added. The device 6 makes controlling the supercharging pressure.

In the engine operating region D which is medium in engine load and low to medium in engine speed, the devices 2 and 3 are determined or selected as the devices at the second step to be added. The device 2 makes controlling the post injection amount. The device 3 makes controlling the post injection timing.

In the engine operating region E which is medium in engine load and low to medium in engine speed, the devices 2, 3 and 6 are determined or selected as the devices at the second step to be added. The device 2 makes controlling the post injection amount. The device 3 makes controlling the post injection timing. The device 6 makes controlling the supercharging pressure.

In the engine operating region F which is high in engine load, only the device 6 is determined or selected as the device at the second step to be added. The device 6 makes controlling the supercharging pressure.

It will be seen that the devices preferentially used at the second step in the respective engine operating ranges are tabulated in FIG. 5B.

At step S13, a time constant of each of the device(s) for raising the exhaust gas temperature, determined at step S12 is set. More specifically, similarly to the case where the time constant of each device at the first step is set in step 8, when only one device is selected as in the engine operating region C and the engine operating region F, the selected device 6 is immediately operated. However, when a plurality of the devices are selected as in other engine operating regions A, B, D and E, the time constant of each device is set in order to make temperature raising responses of the respective devices at the same level. For example, in case that a delay time of each device between the time at which the operating command is issued and the time at which the device is actually operated is different among the plurality of the devices 1 to 6, the outputs of the operating commands of other devices than the device having the longest delay time are delayed such that operations of the other devices are initiated at the operation initiating timing of the device having the longest delay time.

At step S14, similarly to the case of the control at the first step executed at step S9, the increasing and decreasing control amount of each device for raising the exhaust gas temperature is set.

At step S15, a decision is made as to whether a deviation (the target DPF temperature—actual DPF temperature) between the target DPF temperature and the actual DPF temperature is larger than a certain level or not after the DPF regeneration control at the second step is added. When the deviation is decided to be larger than the certain level, the flow goes back to step S12 at which a present control is continued. When the deviation is decided to be lowered to a level of not larger than the certain level, the flow goes to step S16 at which the open control is changed into the feedback control in order to converge the actual DPF temperature into the target DPF temperature similarly to at step S11.

As discussed above, after the open control shifts to the feedback control toward the target DPF temperature at steps 11 and 16, a decision is made as to whether the regeneration of DPF has been completed or not (i.e., the whole collected PM has been completely burned off or not) at step 17. When the regeneration is decided to have been completed, the flow goes to step S18 at which the exhaust gas temperature raising control by the presently operated device(s) is stopped so that the exhaust gas temperature raising control is changed into a normal state control, thus completing the DPF regeneration control.

With the above discussed control, in the engine operating region A which is low in engine speed and low in engine load so as to be small in fuel injection amount and exhaust gas flow amount, a rising sensitivity of exhaust gas temperature becomes high by reducing the amount of fresh air upon decreasing the intake air amount or decreasing the opening degree of the throttle valve, and therefore the decreasing the intake air amount is preferentially made. However, since a loss due to the intake air amount decreasing becomes large even at a low engine load when the engine speed increases, the preference of using the device for decreasing the intake air amount is lowered in a medium engine speed engine operating region so that using the device is made in the DPF regeneration control at the second step as an auxiliary measure.

Additionally, since an exhaust gas flow amount is small in the low engine load engine operating regions A, B and C, the rising sensitivity of the exhaust gas temperature due to the post injection by the devices 2 and 3 is high, and therefore the post injection is preferentially made. However, influence of the post injection on a fuel consumption and an engine performance appears with an increase in engine load, so that the preference of the post injection is lowered in the medium engine load engine operating regions D and E while the post injection is not made in the high engine load engine operating region F.

Further, the EGR valve opening degree control by the device 5 is preferentially made because the rising sensitivity of the exhaust gas temperature is high in the medium engine load engine operating region D in which the exhaust gas temperature is relatively high. However, in the low engine load engine operating regions A and B, the EGR valve opening degree control is executed upon lowering the preference thereof because the EGR gas temperature is low so that the rising sensitivity of the exhaust gas temperature is low in the engine operating regions. In the high engine speed engine operating regions C and E and in the high engine load engine operating region F, EGR largely affects a driveability or power output of the engine, and therefore no EGR valve opening degree control is executed.

Furthermore, in the low engine load engine operating region where no supercharging is inherently executed, a supercharging pressure decreasing effect (decreasing amount) is small so that the exhaust gas temperature rising sensitivity is low, and therefore the supercharging pressure control by the device 6 is executed upon lowering the preference of the supercharging pressure control. In the medium engine load engine operating region D, the supercharging pressure decreasing effect (decreasing amount) increases so that the exhaust gas temperature rising sensitivity is high, and therefore the supercharging pressure control is preferentially executed. However, in the high engine speed engine operating region C where the engine load is medium or higher, and in the high engine load engine operating region F, a supercharging pressure decrease largely affects the driveability or power output of the engine, and therefore the supercharging pressure control is executed upon lowering the preference thereof.

Furthermore, the exhaust gas temperature rising sensitivity by retarding the main injection timing by the device 4 is high and slightly affects the driveability of the engine in all the engine operating regions, and therefore the retarding the main injection timing is preferentially executed in all the engine operating regions.

Thus, the device(s) which are high in the exhaust gas temperature rising sensitivity and slightly affects the driveability are preferentially operated for each engine operating region. Additionally, the device(s) which are low in the exhaust gas temperature rising sensitivity and largely affects the driveability are operated upon being lowered in preference or not operated. Accordingly, the exhaust gas temperature can be smoothly converged into the target temperature thereby raising a regeneration efficiency of DPF, maintaining the driveability at a suitable level. Furthermore, when a plurality of the devices are selected to be operated in the first step or the second step, the time constant of each device is so set as to obtain the same temperature rising response, so that the respective devices are initiated to be operated at the same time thereby smoothly raising the temperature of exhaust gas to be supplied to DPF. The feedback control made after raising the exhaust gas temperature can be stably accomplished.

The entire contents of Japanese Patent Application P2003-019312 (filed Jan. 28, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method of operating an exhaust gas purifying system for an internal combustion engine, the exhaust gas purifying system including a particulate filter disposed in an exhaust gas passageway of the engine to collect particulates in exhaust gas flowing through the exhaust gas passageway, the collected particulates being burnt off to be removed by raising a temperature of exhaust gas in a condition in connection with the particulate filter; and a plurality of devices for raising the temperature of exhaust gas to be introduced into the particulate filter through the exhaust gas passageway when the collected particulates are burned off to be removed, the operating method comprising:
   selecting at least one of the devices in accordance with an engine operating region; and
   preferentially operating the selected at least one of the devices to raise the exhaust gas temperature;
   setting a target exhaust gas temperature when the collected particulates are burned off to be removed;
   comparing the target exhaust gas temperature with an actual exhaust gas temperature which has been raised by the preferentially operated at least one of the devices; and
   adding a separate device to be operated for raising the exhaust gas temperature when a degree at which the exhaust gas temperature is raised by the preferentially operated at least one of the devices is lower than a level.

2. An exhaust gas purifying system for an internal combustion engine, comprising:
   a particulate filter disposed in an exhaust gas passageway of the engine to collect particulates in exhaust gas flowing through the exhaust gas passageway, the collected particulates being burnt off to be removed by raising a temperature of exhaust gas in a condition in connection with the particulate filter; and
   a plurality of devices for raising the temperature of exhaust gas to be introduced into the particulate filter through the exhaust gas passageway when the collected particulates are burned off to be removed;
   wherein at least one of the devices is selected in accordance with an engine operating region and preferentially operated for raising the exhaust gas temperature, a target exhaust gas temperature is set when the collected particulates are burned off to be removed; the target exhaust gas temperature is compared with an actual exhaust gas temperature which has been raised by the preferentially operated at least one of the devices; and a separate device to be operated is added for raising the exhaust gas temperature when a degree at which the exhaust gas temperature is raised by the preferentially operated at least one of the devices is lower than a level.

3. An exhaust gas purifying system for an internal combustion engine, comprising:
   a particulate filter disposed in an exhaust gas passageway of the engine to collect particulates in exhaust gas flowing through the exhaust gas passageway, the collected particulates being burnt off to be removed by raising a temperature of exhaust gas in a condition in connection with the particulate filter; and
   a plurality of means for raising the temperature of exhaust gas to be introduced into the particulate filter through the exhaust gas passageway when the collected particulates are burned off to be removed;
   wherein at least one of the means is selected in accordance with an engine operating region and preferentially operated for raising the exhaust gas temperature, a target exhaust gas temperature is set when the collected particulates are burned off to be removed; the target exhaust gas temperature is compared with an actual exhaust gas temperature which has been raised by the preferentially operated at least one of the means; and a separate of the means for raising temperature to be operated is added for raising the exhaust gas temperature when a degree at which the exhaust gas temperature is raised by the preferentially operated at least one of the means is lower than a level.

4. An exhaust gas purifying system for an internal combustion engine, comprising:

a particulate filter disposed in an exhaust gas passageway of the engine to collect particulates in exhaust gas flowing through the exhaust gas passageway, the collected particulates being burnt off to be removed by raising a temperature of exhaust gas in a condition in connection with the particulate filter;

a plurality of devices for raising the temperature of exhaust gas to be introduced into the particulate filter through the exhaust gas passageway when the collected particulates are burned off to be removed; and a control unit configured to select at least one of the devices in accordance with an engine operating region and preferentially operate the selected at least one of the devices so as to raise the exhaust gas temperature, wherein the control unit is configured to set a target exhaust gas temperature when the collected particulates are burned off to be removed; compare the target exhaust gas temperature with an actual exhaust gas temperature which has been raised by the preferentially operated at least one of the devices; and add a separate device to be operated for raising the exhaust gas temperature when a degree at which the exhaust gas temperature is raised by the preferentially operated at least one of the devices is lower than a level.

5. An exhaust gas purifying system as claimed in claim 4, wherein the control unit is configured such that when a plurality of the devices is selected and preferentially operated, a time constant of each device is set in a manner to make the substantially same responses for raising the exhaust gas temperature, of the plurality of the devices.

6. An exhaust gas purifying system as claimed in claim 4, wherein the control unit is configured such that when a deviation between the target exhaust gas temperature and the actual exhaust gas temperature becomes smaller than a level, a control is changed into a feedback control for the exhaust gas temperature by using the at least one device which has been operated.

7. An exhaust gas purifying system as claimed in claim 4, wherein the plurality of the devices for raising the exhaust gas temperature include a device for decreasing an intake air amount, operated mainly at a low engine load.

8. An exhaust gas purifying system as claimed in claim 4, wherein the plurality of the devices for raising the exhaust gas temperature include a device for controlling a fuel injection amount in a post injection after a main injection, operated mainly at low and medium engine loads.

9. An exhaust gas purifying system as claimed in claim 4, wherein the plurality of the devices for raising the exhaust gas temperature include a device for correcting a fuel injection amount in the main injection, operated mainly at low and medium engine loads.

10. An exhaust gas purifying system as claimed in claim 4, wherein the plurality of the devices for raising the exhaust gas temperature include a device for controlling an amount of EGR gas, operated mainly at low and medium engine loads.

11. An exhaust gas purifying system as claimed in claim 4, wherein the plurality of the devices for raising the exhaust gas temperature include a device for controlling a supercharging pressure.

* * * * *